United States Patent
Arnz et al.

(10) Patent No.: US 9,786,046 B2
(45) Date of Patent: Oct. 10, 2017

(54) METHOD AND DEVICE FOR DETERMINING A LATERAL OFFSET OF A PATTERN ON A SUBSTRATE RELATIVE TO A DESIRED POSITION

(71) Applicant: Carl Zeiss SMT GmbH, Oberkochen (DE)

(72) Inventors: Michael Arnz, Oberkochen (DE); Dirk Seidel, Jena (DE)

(73) Assignee: Carl Zeiss SMT GmbH, Oberkochen (DE)

( * ) Notice: Subject to any disclaimer, the term of this patent is extended or adjusted under 35 U.S.C. 154(b) by 76 days.

(21) Appl. No.: 14/881,513

(22) Filed: Oct. 13, 2015

(65) Prior Publication Data

US 2016/0104275 A1    Apr. 14, 2016

(30) Foreign Application Priority Data

Oct. 14, 2014 (DE) .................. 10 2014 114 864

(51) Int. Cl.
| | |
|---|---|
| *G06K 9/00* | (2006.01) |
| *G06F 17/50* | (2006.01) |
| *G06T 7/00* | (2017.01) |
| *G06T 7/33* | (2017.01) |

(52) U.S. Cl.
CPC ............... *G06T 7/001* (2013.01); *G06T 7/33* (2017.01); *G06T 2207/10056* (2013.01); *G06T 2207/30148* (2013.01); *G06T 2207/30208* (2013.01)

(58) Field of Classification Search
CPC . G06T 7/001; G06T 7/33; G06T 2207/30208; G06T 2207/10056; G06T 2207/30148; G06T 7/0044; G06T 7/004; G06T 2207/30141

USPC ............... 382/100, 141, 144, 145, 149, 151; 716/52, 50, 51, 53, 56, 55, 132; 430/30, 430/5, 311; 355/67, 52, 30, 77, 53;
(Continued)

(56) References Cited

U.S. PATENT DOCUMENTS

| | | | |
|---|---|---|---|
| 8,737,676 B2 * | 5/2014 | Tsuchiya ............... G06T 7/0002 382/100 |
| 9,366,637 B2 * | 6/2016 | Laengle .................... G06T 7/80 |
| 2006/0048090 A1 | 3/2006 | Feldman | |

(Continued)

FOREIGN PATENT DOCUMENTS

| | | | | |
|---|---|---|---|---|
| DE | 102010045135 | 9/2010 | ............... | G03F 9/00 |
| DE | 10 2009 016 952 | 10/2010 | ............... | G03F 1/00 |

*Primary Examiner* — Sheela C Chawan
(74) *Attorney, Agent, or Firm* — Fish & Richardson P.C.

(57) ABSTRACT

A method for determining a lateral offset of a pattern on a substrate relative to a desired position with the steps: a) providing a plurality of measurement and simulation images of the pattern with equidistant defocus positions, b) forming a plurality of first and second pairs, which each has a measurement image and a simulation image, wherein each first pair has the same first focal distance and each second pair has the same second focal distance, being different from the first focal distance, of the defocus positions thereof, and determining a first and second lateral distance of the patterns for each first and second pair, respectively, c) determining a first and a second linear fit line based on the determined first and second lateral distances, respectively, and d) determining the lateral offset of the pattern on the substrate relative to the desired position using the linear fit lines of step c).

20 Claims, 5 Drawing Sheets

(58) Field of Classification Search
USPC ............... 703/13, 6; 257/E21.525, E21.001,
257/E21.521; 378/35, 1, 34
See application file for complete search history.

(56) References Cited

U.S. PATENT DOCUMENTS

| | | | |
|---|---|---|---|
| 2006/0239507 A1* | 10/2006 | Schenck | G01B 21/045 382/103 |
| 2008/0051772 A1 | 2/2008 | Suckewer et al. | |
| 2009/0214103 A1* | 8/2009 | Tanaka | G06T 7/001 382/145 |
| 2010/0254591 A1 | 10/2010 | Scherubl et al. | |
| 2012/0063666 A1 | 3/2012 | Arnz et al. | |
| 2015/0324997 A1* | 11/2015 | Murakami | G02B 21/365 348/207.1 |

* cited by examiner

METHOD AND DEVICE FOR DETERMINING A LATERAL OFFSET OF A PATTERN ON A SUBSTRATE RELATIVE TO A DESIRED POSITION

CROSS-REFERENCE TO RELATED APPLICATION

This application claims priority to German application 102014114864.9, filed on Oct. 14, 2014, the entire contents of which are hereby incorporated by reference.

TECHNICAL FIELD

The present invention relates to a method and a device for determining a lateral offset of a pattern on a substrate relative to a desired position.

BACKGROUND

By way of example, such a method and such a device are used in the field of checking and monitoring lithography masks for semiconductor production. The pattern can be, e.g., a marker structure or part of a marker structure on the lithography mask. In order now to check or monitor a lithography mask, the position of the pattern needs to be determined very accurately. In particular, it is of interest as to whether the position thereof deviates from the desired position. Since the semiconductors to be produced are becoming more highly integrated and therefore have ever smaller structures, there is a continuous need for improving the accuracy when determining the position. Moreover, the number of patterns, the positions of which are to be determined on the substrate, is also increasing.

SUMMARY

In one general aspect, the invention provides a method and a device for determining a lateral offset of a pattern on a substrate relative to a desired position, in which there can be an increase in the accuracy of the position determination and an improvement in the speed of the position determination. The method comprises the following steps:

a) providing a plurality of measurement images of the pattern, which were produced by an optical recording unit in different recording defocus positions along a focusing direction of the recording unit, wherein the recording defocus positions are equidistant with a predetermined increment, b) producing a plurality of simulation images, which simulate the recording of the pattern with the optical recording unit in different simulation defocus positions in the focusing direction, wherein at least one optical aberration of the recording unit is taken into account when producing the simulation images and the simulation defocus positions are equidistant with the predetermined increment, c) forming a plurality of first pairs, which each have a measurement image and a simulation image, wherein each first pair has the same first focal distance of the defocus positions thereof, and determining a first lateral distance of the patterns for each first pair, d) determining a first linear fit line on the basis of the determined first lateral distances, e) forming a plurality of second pairs, which each have a measurement image and a simulation image, wherein each second pair has the same second focal distance of the defocus positions thereof, which is different from the first focal distance of the first pairs, and determining a second lateral distance of the patterns for each second pair, f) determining a second linear fit line on the basis of the determined second lateral distances, g) determining the lateral offset of the pattern on the substrate relative to the desired position using the linear fit lines in accordance with steps d) and f).

In the method according to the invention, only a linear fit needs to be performed in steps d) and f), which is possible with high reproducibility. The present parabolic dependence of the position of the pattern on the defocus position due to optical aberrations of the recording unit is already compensated for by the simulation images. These are simulated in such a way that this parabolic dependence is taken into account, and so only the described linear fit needs to be carried out in steps d) and f). The simulation images themselves only need to be calculated once and only need to have the same increment as the recorded measurement images. Thus, a stack of simulation images and a stack of measurement images are available. The offset of these two stacks from one another does not influence the determination of the lateral offset of the pattern on the substrate relative to the desired position. Hence, the stack of simulation images only needs to be calculated once and can be used for different measurement image stacks of the pattern. This leads to a higher speed compared to previously known methods, with, simultaneously, a very high accuracy also being achievable here.

Here, in particular, a defocus position is understood to mean the distance from the best focus. At the best focus, e.g., the image sharpness is at a maximum, and so the best image is present in the case of an image from the best focus. The defocus position at the best focus is therefore zero. If the defocus position has a value not equal to zero, the image is less sharp than the image from the best focus.

Therefore, at most one measurement image from the best focus can be contained in the measurement images in accordance with step a). In general, none of the measurement images will be an image from the best focus.

The measurement images are preferably provided in step a) in such a way that the recording defocus positions of the measurement images are on either side of the best focus. Then, in relation to the best focus, there is at least one recording defocus position which has a positive value and one recording defocus position which has a negative value along the focusing direction. At least one recording defocus position therefore has a greater value than the value of the best focus and at least one recording defocus position has a smaller value than the value of the best focus. It is also possible to state that at least one recording defocus position deviates from the best focus in the focusing direction and at least one recording defocus position deviates from the best focus in the opposite direction to the focusing direction.

The same naturally also applies to the simulation defocus positions. These also describe the distance from the best focus and hence from the best simulation focus.

Moreover, the simulation images in step c) are preferably provided in such a way that the simulation defocus positions are on either side of the best focus.

A cross correlation of the measurement image and simulation image of the respective first pair can be carried out in step c) to determine the first lateral distance. Similarly, a cross correlation of the measurement image and simulation image of the respective second pair can be carried out in step e) to determine the second lateral distance. Using this, the first and second lateral distance can easily be determined in a quick manner and with a high accuracy.

However, it is also possible for the lateral position of the pattern in the measurement image and simulation image of the respective first pair to be determined (e.g., by means of a thresholding method) and for the first lateral distance to be determined from the lateral positions. Similarly, in step e), the lateral position of the pattern in the measurement image and simulation image of the respective second pair can be determined and the second lateral distance can be determined from the lateral positions. Here too, use can be made of, e.g., the thresholding method.

The first focal distance and the second focal distance can be selected in such a way that the difference in the magnitudes of the first focal distance and second focal distance equals the predetermined increment or an integer multiple of the predetermined increment. In particular, the first focal distance and the second focal distance can have different signs.

In the method according to the invention it is possible, in step g), for a linear correction line to be determined from the two linear fit lines of step d) and f) and for the lateral offset of the pattern on the substrate relative to the desired position to be determined on the basis of the linear correction line.

Determining the linear correction line corresponds to the ideal case, which would occur if the defocus positions of measurement image and simulation image were to coincide. Hence, in this case, the stack of simulation images would coincide with the stack of measurement images. However, since this generally is not the case, this case of coincidence of the two image stacks is simulated by determining the linear correction line and the lateral offset of the pattern on the substrate relative to the desired position can be determined on the basis of the linear correction line as the location of the pattern on the substrate in the best focus can be interpolated on the basis of the linear correction line, even though, in general, no recording is available for this focus position of the best focus. In general, in terms of the defocus position thereof and hence in terms of the focal position thereof, the measurement images will have a slight distance from the best focus.

In the method according to the invention, those optical aberrations which lead to a curved profile of the lateral position of the pattern as a function of the simulation defocus position are taken into account in step b). In particular, this is a parabolic dependence in this case.

In step b), a summation of a convolution of an optical function, which is represented as a sum of dyadic products of eigenfunctions, weighted with associated eigenvalues, and which describes the simulation defocus position, the at least one optical aberration and the illumination pupil distribution of the optical recording unit, with a transparency function, which only describes the pattern, can be performed over various eigenfunction indices, and hence over various eigenfunctions, for each defocus-dependent simulation image in order to produce the simulation images.

The optical function preferably only describes the optical properties of the optical recording unit (such as, e.g., simulation defocus positions, the at least one optical aberration, the pupil apodization, the illumination pupil distribution and the magnification of the image) and not the properties of the pattern. Using this, it is possible, in a first step, to calculate the optical function for a recording unit and the special properties thereof, such as, e.g., defocus, optical aberrations, pupil apodization, magnification and illumination pupil distribution. Once this optical function has been calculated, it can be used for every pattern to be imaged. Since the computational outlay for determining the optical function is significantly greater than the outlay in calculating the summation of the convolution of the optical function with the transparency function, the required simulation images can be implemented quickly and with a high accuracy (preferably while the measurement is carried out, as soon as a measurement image stack is present).

In step b), the illumination pupil of the optical recording unit can be subdivided by computation into at least two parts and a separate optical function can be created for each part as a sum of dyadic products of eigenfunctions, weighted with associated eigenvalues, which describes the simulation defocus position, the at least one optical aberration and the illumination pupil distribution and hence a corresponding partial illumination pupil distribution, and the summation of the convolution of the optical function with the transparency function can be performed over various eigenfunction indices for each part in order to obtain a partial simulation image and the partial simulation images can then be summed in order to obtain the simulation image.

This is particularly advantageous if no optical function can be set up for the whole illumination pupil distribution, by means of which a simulation image with the desired accuracy is obtained after summing the convolution of the optical function with the transparency function over the various eigenfunction indices. Here too, the optical function can only describe the optical properties of the optical recording unit (such as, e.g., simulation defocus position, the at least one optical aberration, the pupil apodization, the illumination pupil distribution of the corresponding part and the magnification of the image) and not the properties of the pattern.

Each partial simulation image simulates the imaging by means of the optical recording unit for the case where only the corresponding part of the illumination pupil represents the illumination of the optical recording unit. The partial simulation image is therefore a complete image. Therefore, a simulation image which has the same dimensions as each one of the partial simulation images is obtained by summing the partial simulation images. However, the simulation image obtained by summing the partial simulation images takes into account the whole illumination pupil distribution.

Naturally, the illumination pupil can be subdivided into more than two parts. By way of example, it can be subdivided into three, four, five, six, seven, eight, ten or even more parts.

In particular, it is possible, when calculating the simulation images in step b), to also take into account the polarization of the illumination light and/or the change in polarization during the imaging of the pattern, preferably whilst taking account of diffraction effects at the pattern. In this case, there is also summation over the different polarization directions.

Furthermore, a method for calculating a simulation image, which simulates the optical imaging of a pattern by use of an optical recording unit in an image plane (or aerial image plane), is provided, wherein an optical function is established, which only describes the optical properties of the optical recording unit, and a transparency function is established, which only describes the influence of the pattern during imaging by use of the optical recording unit, with the simulation image being calculated by summing a convolution of the optical function with the transparency function over various eigenfunction indices.

The transparency function can preferably take into account the diffraction effects caused by the pattern during the imaging.

The optical function can be represented as a sum of dyadic products of eigenfunctions, weighted with associated eigenvalues. In this case, the summation of the convolution of the object function with the transparency function can be performed over various eigenfunction indices and therefore over various eigenfunctions. In particular, the optical function can describe the simulation defocus position, at least one optical aberration of the optical recording unit, the illumination pupil distribution and possibly the pupil apodization. Naturally, the optical function can describe even more optical properties of the optical recording unit, such as, e.g., the magnification of the image by way of the optical recording unit.

In the method, the illumination pupil of the optical recording unit can be subdivided by computation into at least two parts and a separate optical function can be created for each part as a sum of dyadic products of eigenfunctions, weighted with associated eigenvalues, which describes the simulation defocus position, the at least one optical aberration, the illumination pupil distribution and hence a corresponding partial illumination pupil distribution, and the summation of the convolution of the optical function with the transparency function can be performed over various eigenfunction indices for each part in order to obtain a partial simulation image and the partial simulation images can then be summed in order to obtain the simulation image.

Furthermore, it is possible to create various optical functions which take into account the change in the polarization during imaging. The summation is then performed over the various optical functions as a function of the polarization direction, in order to arrive at the simulation image.

In another general aspect, a device for determining a lateral offset of a pattern on a substrate relative to a desired position is provided. The device comprises a recording unit, which produces a plurality of measurement images of the pattern in different recording defocus positions along a focusing direction, wherein the recording defocus positions are equidistant with a predetermined increment, a simulation unit, which produces a plurality of simulation images, which simulate the recording of the pattern with the optical recording unit in different simulation defocus positions in the focusing direction, wherein at least one optical aberration of the recording unit is taken into account when producing the simulation images and the simulation defocus positions are equidistant with the predetermined increment, and an evaluation unit, which carries out the following steps:

forming a plurality of first pairs, which each has a measurement image and a simulation image, wherein each first pair has the same first focal distance of the defocus positions thereof, and determining a first lateral distance of the patterns for each first pair, determining a first linear fit line on the basis of the determined first lateral distances, forming a plurality of second pairs, which each has a measurement image and a simulation image, wherein each second pair has the same second focal distance of the defocus positions thereof, which is different from the first focal distance of the first pairs, and determining a second lateral distance of the patterns for each second pair, determining a second linear fit line on the basis of the established second lateral distances, determining the lateral offset of the pattern on the substrate relative to the desired position using the determined linear fit lines.

The device according to the invention can be developed in such a way that it can carry out the steps of the method according to the invention (including the developments thereof) for determining a lateral offset of a pattern on a substrate relative to a desired position.

It is understood that the features mentioned above and yet to be explained below can be used not only in the specified combinations, but also in other combinations or on their own, without departing from the scope of the present invention.

BRIEF DESCRIPTION OF DRAWINGS

Below, the invention will still be explained in more detail in an exemplary manner on the basis of the attached drawings, which also disclose features useful to the invention. In detail.

DETAILED DESCRIPTION

Figure 1:
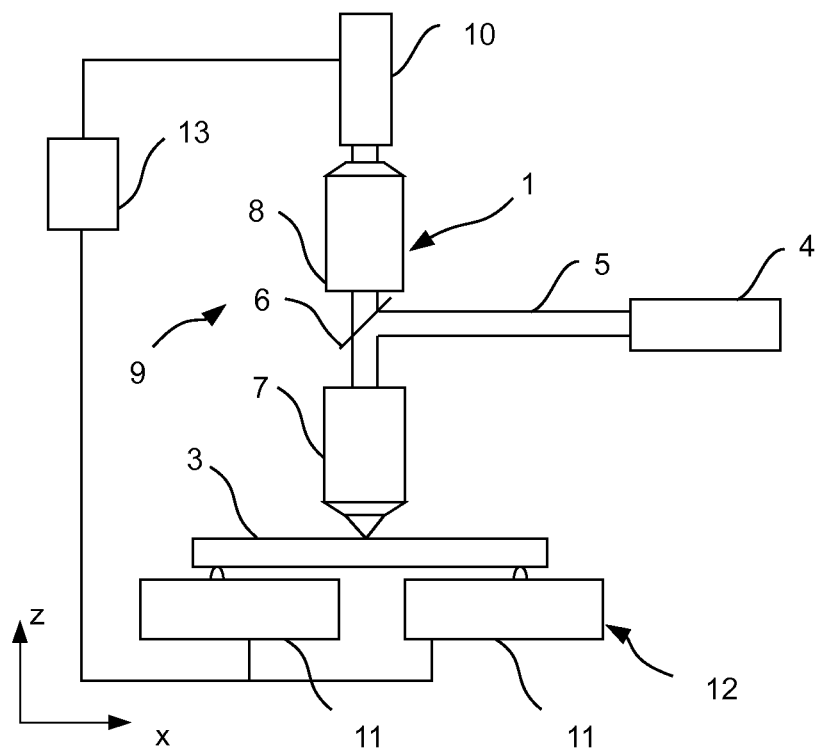
FIG. 1 shows a schematic view of an embodiment of the device according to the invention for determining a lateral offset of a pattern on a substrate relative to a desired position.
Figure 2:
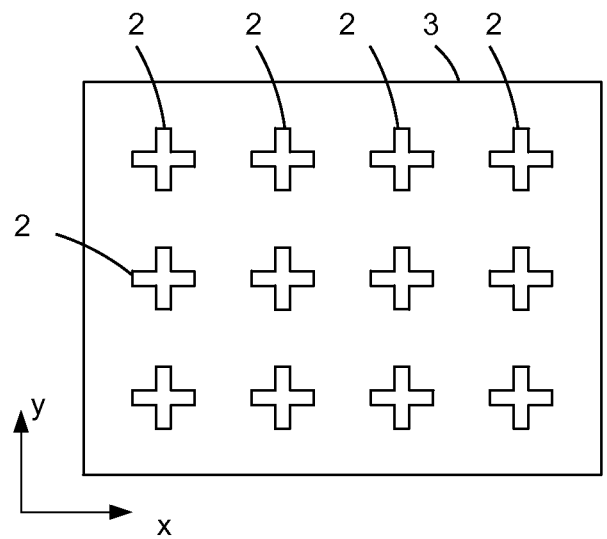
FIG. 2 shows a schematic plan view of the substrate 3 with the patterns 2.

In the embodiment shown in FIG. 1, the device 1 according to the invention for determining a lateral offset of a pattern 2 on a substrate 3, which is shown in a magnified fashion in FIG. 2 in a plan view, relative to an intended position is embodied as a microscope.

Various patterns 2 are depicted in the plan view of the substrate 3 in accordance with FIG. 2. Here, the patterns 2 are depicted as crosses, the positions of which on the substrate 3 are intended to be established separately or relative to an adjacent pattern 2.

The microscope 1 comprises an illumination source 4, which emits incoherent or partly coherent illumination radiation 5 with a wavelength of, e.g., 193 nm. The illumination radiation 5 is guided by a deflection mirror 6 to an imaging lens 7 and directed by the latter onto the substrate 3 for illumination purposes.

The substrate 3, which may, e.g., be embodied as a lithography mask, is imaged on a CCD camera 10 via the imaging lens 7, the partly transparent deflection mirror 6 and a tube optical assembly 8, which form an imaging optical assembly 9 together with the imaging lens 7, in order to generate an image of part of the substrate 3 and, here in particular, of the pattern 2. Together with the illumination source 4, the imaging optical assembly 9 forms a recording unit. The CCD camera may be part of the recording unit.

The device 1 furthermore comprises an object stage 11, by means of which the substrate 3 can be positioned both laterally (i.e., in the y-direction that is perpendicular to the plane of the drawing, and in the x-direction) and in the observation direction (i.e., in the z-direction). Therefore, the object stage 11 forms a movement module 12 for the relative movement between object stage 11 and imaging optical assembly 9. Alternatively, the movement module 12 can be embodied in such a way that the object stage 11 is only moved in the x-direction and in the y-direction, and the imaging optical assembly 9 is moved in the z-direction. Also, it is possible for, e.g., only the imaging optical assembly to be moved in the x-direction, y-direction and z-direction.

The device 1 is controlled by use of a control unit 13, wherein the control unit 13 can also serve to evaluate the recorded measurement images, as is explained in detail below. For example, the control unit 13 may receive simulation images from a simulation unit (not shown in the figure) and evaluate the measurement images and simulation images.

To this end, a plurality of measurement images of a pattern 2 are created with the imaging optical assembly 9 and the CCD camera 10 at different recording defocus positions (and therefore in different planes) along the focusing direction (z-direction) of the imaging optical assembly 9, with the recording defocus positions being equidistant. Therefore, a so-called z-stack is generated, in which only the defocus position along the z-direction is varied, and not the lateral position (x-direction and y-direction). The spacing between directly adjacent recording defocus positions corresponds to a predetermined increment $\Delta Z$.

By way of example, N measurement images can be recorded, the defocus positions of which can be specified as follows: $z_n = z_1 + (n-1)\Delta Z$ with $n=1 \ldots N$.

Here, the z-values represent differences from the best focus position, and so $z=0$ μm corresponds to the best focus position. The best focus position can be determined from the measurement images by virtue of an image sharpness measure being plotted in a defocus-dependent, and therefore focus-dependent, manner and interpolation being carried out. The best focus, and hence the best defocus position, is the defocus position with the maximum image sharpness. By way of example, the sum of squared derivatives, the contrast, the edge gradient, etc., can be used as image sharpness measure.

Furthermore, simulation images are generated, which simulate the recording of the pattern 3 using the imaging optical assembly 9 and the CCD camera 10 at different simulation defocus positions in the focusing direction, with at least one optical aberration of the imaging optical assembly 9 being taken into account when creating the simulation images. The simulation defocus positions are also equidistant. The distance between directly adjacent simulation defocus positions once again corresponds to $\Delta Z$ and it is therefore identical to the spacing between the directly adjacent recording defocus positions of the measurement images. The defocus positions of the simulation images can therefore be specified as follows:

$$Z_m = Z_1 + (n-1)\Delta Z \text{ with } m=1 \ldots M > N,$$

where, in this case, $z=0$ μm likewise corresponds to the position of the best focus. This position can be determined from the simulation images by virtue of the already described image sharpness measure being plotted to the simulation images in a defocus-dependent, and therefore focus-dependent, manner and interpolation being carried out. The best focus for the simulation images is the defocus position or focus location with maximum image sharpness.

In the general case, the defocus positions of the measurement images and the simulation images are displaced from one another by $\Delta z$. Below, focus position is also used for defocus position. Moreover, recording focus position is used for recording defocus position and simulation focus position is used for simulation defocus position.

Figure 3:
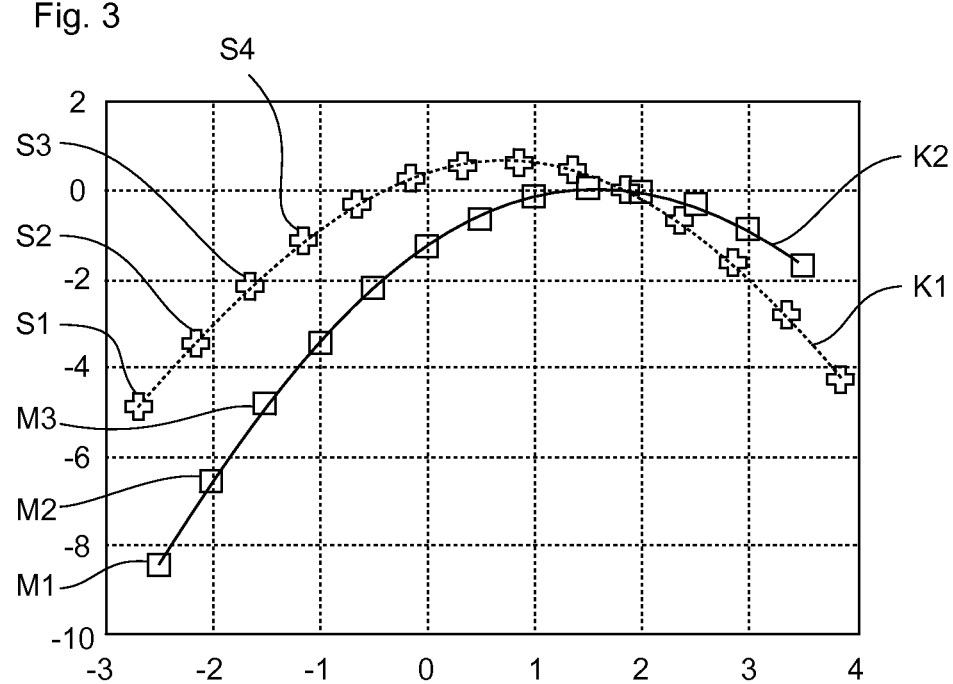
FIG. 3 shows an illustration of the lateral position of the pattern in the measurement images and in the simulation images as a function of the focal position.

This becomes clear from the illustration in accordance with FIG. 3, in which the lateral position of the pattern 2 in the images is depicted as a function of the defocus position or the focus position using small squares for the measurement images and using small crosses for the simulation images. In FIG. 3, the focal position in μm is plotted along the abscissa and the lateral position of the pattern in nm is plotted along the ordinate. For simplification, the assumption is made here that the lateral position varies in the x-direction. As indicated in the illustration of FIG. 3, the measurement points, and therefore the individual focus positions, for the measurement images and simulation images do not lie at the same focal values (z-values) in relation to the respective best focus but have the above-described offset $\Delta z$.

Since the real optical aberrations of the imaging optical assembly 9 are considered when generating the simulation images, the curve K1 connecting the simulation values has the same curvature as the curve K2 connecting the measurement values. To a first approximation, both curves K1 and K2 have a parabolic curvature.

Figure 4:
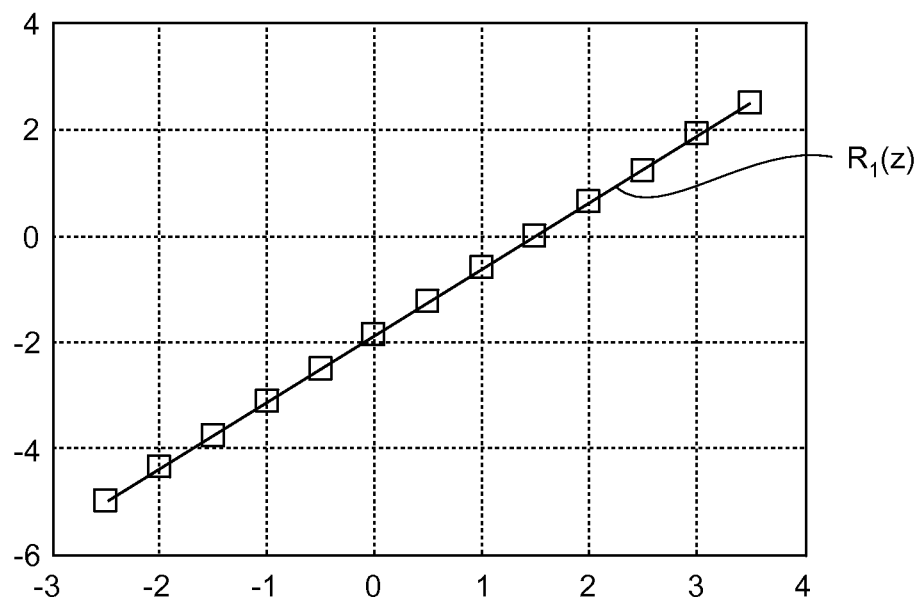
FIG. 4 shows a first focus-dependent offset of the pattern from the first pairs of measurement image and simulation image.

In order to determine the lateral offset of the pattern 2 on the substrate 3 relative to an intended position, first pairs are formed, which pairs each comprise a measurement image and a simulation image. The pairs are characterized in that the distance $\Delta z_1$ is the same for all pairs. The offset of the pattern 2 is determined in each case for the first pairs formed thus and said offset is plotted against the focal position z, as depicted schematically in FIG. 4 (the focal position in μm is plotted along the abscissa and the offset in nm is plotted along the ordinate). This can be described as follows: $Z_{n+k-1} = z_n - \Delta z_1$ with $n=1 \ldots N$ and $\Delta z_1 < 0$. Therefore, with $k=2$, the following pairs are formed: S2 with M1, S3 with M2, S4 with M3, . . . . Therefore, respectively one simulation image is combined with the measurement image respectively lying to the left thereof in relation to the focal position in order to form a pair. $R_1(z)$ can then be denoted as focus-dependent offset or focus-dependent registration and it corresponds to the deviation of the lateral positions between the respective paired measurement image and simulation image. Since the simulation images were generated with the real optical aberrations, $R_1(z)$ has a curvature-free, and therefore linear, behavior as a function of the focal position z, which is why it is possible to dispense with a parabolic fit term. Therefore, a linear fit is sufficient and $R_1(z)$ corresponds approximately to $R_1(0) + A_1 z$.

Figure 5:
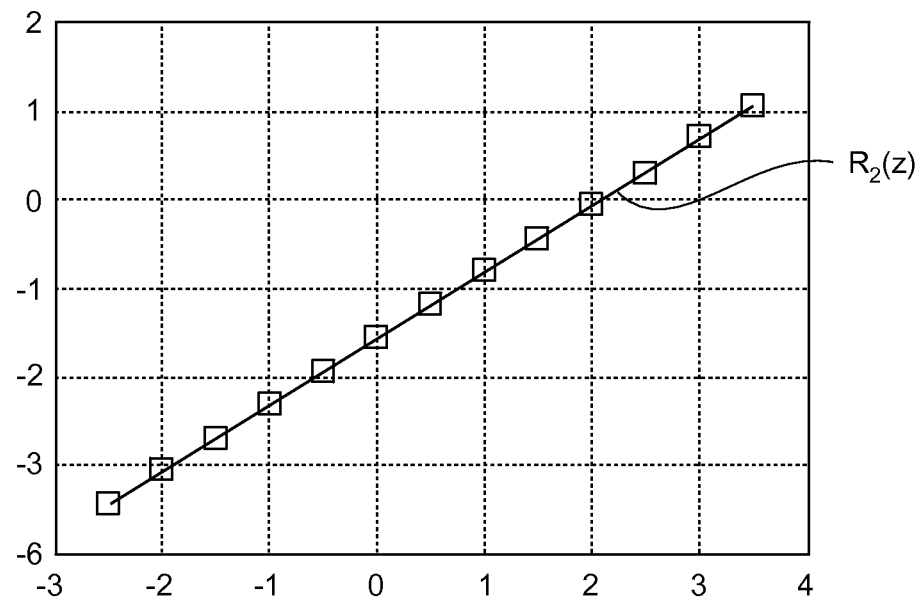
FIG. 5 shows a second focus-dependent offset of the pattern from the second pairs of measurement image and simulation image.

Furthermore, second pairs of measurement image and simulation image are generated, in which the foci are smaller, equaling the measurement foci, which can be expressed as follows: $Z_{n+k-1} = z_n - \Delta z_2$ with $n=1 \ldots N$ and $\Delta z_2 > 0$. With $k=1$, the following pairs are formed: S1 with M1, S2 with M2, S3 with M3, . . . . Therefore, the simulation image is paired with the measurement image respectively lying to the right thereof in relation to the focal position. The fit of the focus-dependent registration accordingly is referred to as $R_2(z)$, corresponds approximately to $R_2(0) + A_2 z$ and is shown in FIG. 5 in the same way as in FIG. 4.

The sought-after offset $R_0(0)$ of the pattern 2 on the substrate 3, and therefore the offset of the best focus, can be determined as follows from the fit parameter sets $\{R_1(0), A_1\}$ and $\{R_2(0), A_2\}$:

$$R_0(0)=(\Delta z_2 R_1(0)-\Delta z_1 R_2(0)-\tfrac{1}{2}\Delta z_2 \Delta z_1 [A_2-A_1])/(\Delta z_2-\Delta z_1).$$

In the method according to the invention, the simulation images were generated with the real optical aberrations, and so the parabolic component (the curvature) of the focus-dependent registration R(z) is identical to zero since the profiles of the lateral offset of the pattern as a function of the focus position have the same curvature for the measurement images and simulation images. Hence, the fit of the registration as a function of the focal position can be restricted to a constant and a linear component, which significantly improves the reproducibility of the registration in the best focus determined therefrom.

The registration can be determined directly by way of a cross correlation between the respective pair of measurement image and simulation image. However, the above-described forming of the difference between the established lateral positions in the measurement image and the simulation image is possible. By way of example, the lateral positions can be established by way of thresholding methods.

The lateral position of the pattern as a function of the corresponding focus position can be specified as follows as a function of the defocus z for the measurement image, if the assumption is made that the ideal focus position lies at z=0:

$$X_M(z)=X_2+\tfrac{1}{2}C\cdot(z-\zeta_2)^2$$

In this formula, $X_M(z)$ denotes the measured lateral position as a function of the focus position, $X_2$ denotes the actually present lateral offset, C denotes the curvature $d^2X_M/dz^2$, with the assumption being made that the parabola vertex is at $z=\zeta_2$.

Accordingly, the lateral position of the pattern in the simulation images can be specified as follows as a function of the focal position z:

$$X_R(z)=X_1+\tfrac{1}{2}C\cdot(z-\zeta_1)^2,$$

where $X_1$ specifies the actually present deviation, the curvature C equals $d^2X_R/dz^2$, and the parabola vertex lies at $z=\zeta_1$. The curvature C for the offset of the pattern is the same in the measurement images and in the simulation images.

The focus-dependent registration $R_0(z)$ can then be described as follows:

$$R_0(z)=X_M(z)-X_R(z)=R_0(0)+A_0\cdot z$$

with $$R_0(0)=X_2-X_1+\tfrac{1}{2}C\cdot(\zeta_2^2-\zeta_1^2); A_0=C\cdot(\zeta_1-\zeta_2)$$

Here, $R_0(0)$ describes registration in the best focus and $A_0$ is a telecentric term.

Since the measurement image stack and the simulation image stack are generally offset from one another by $\Delta z$, this needs to be accordingly taken into account in the formulae. By way of example, this can be taken into account in the formula for the lateral position of the pattern in the simulation images, as specified below:

$$X_R(z-\Delta z)=X_1+\tfrac{1}{2}C\cdot(z-\Delta z-\zeta_1)^2$$

The registration as a function of the focal position z can then be specified as follows:

$$R_{\Delta z}(z)=X_M(z)-X_R(z-\Delta z)=R_{\Delta z}(0)+A_{\Delta z}\cdot z$$

with $$R_{\Delta z}(0)=X_2-X_1+\tfrac{1}{2}C\cdot(\zeta_2^2-[\zeta_1+\Delta z]^2); A_{\Delta z}=C\cdot(\zeta_1+\Delta z-\zeta_2)$$

As emerges from these formulae, the registration in the best focus, and therefore the registration $R_0(0)$, cannot be established if only $R_{\Delta z}(0)$ and $A_{\Delta z}$ are known. However, if, as already described above, two comparisons are carried out, in which the offset between the paired measurement images and simulation images is different, the registration $R_0(0)$ in the best focus can be established, as will be shown below. To this end, the following replacements are carried out:

$$R_{\Delta z_1}(0)=R_1(0)$$

$$R_{\Delta z_2}(0)=R_2(0)$$

$$A_{\Delta z_1}=A_1$$

$$A_{\Delta z_2}=A_2$$

The linear fits $R_1(z)$ and $R_2(z)$ are established in the described manner. From these, the fit parameter sets $\{R_1(0), A_1\}$ and $\{R_2(0), A_2\}$ can be established.

From these values, it is then possible to establish the curvature C using the following formula:

$$C=(A_2-A_1)/(\Delta z_2-\Delta z_1)$$

Using the following formulae:

$$R_1(0)=R_0(0)-C\cdot\Delta z_1\cdot(\zeta_1+\tfrac{1}{2}\Delta z_1)$$

$$R_2(0)=R_0(0)-C\cdot\Delta z_2\cdot(\zeta_1+\tfrac{1}{2}\Delta z_2)$$

it is possible to establish the specified registration $R_0(0)$:

$$R_0(0)=(\Delta z_2\cdot R_1(0)-\Delta z_1\cdot R_2(0))/(\Delta z_2-\Delta z_1)-\tfrac{1}{2}C\cdot\Delta z_2\cdot\Delta z_1=(\Delta z_2\cdot R_1(0)-\Delta z_1\sim R_2(0)-\tfrac{1}{2}\Delta z_2\cdot\Delta z_1\cdot[A_2-A_1]/(\Delta z_2\Delta z_1)$$

Figure 6:
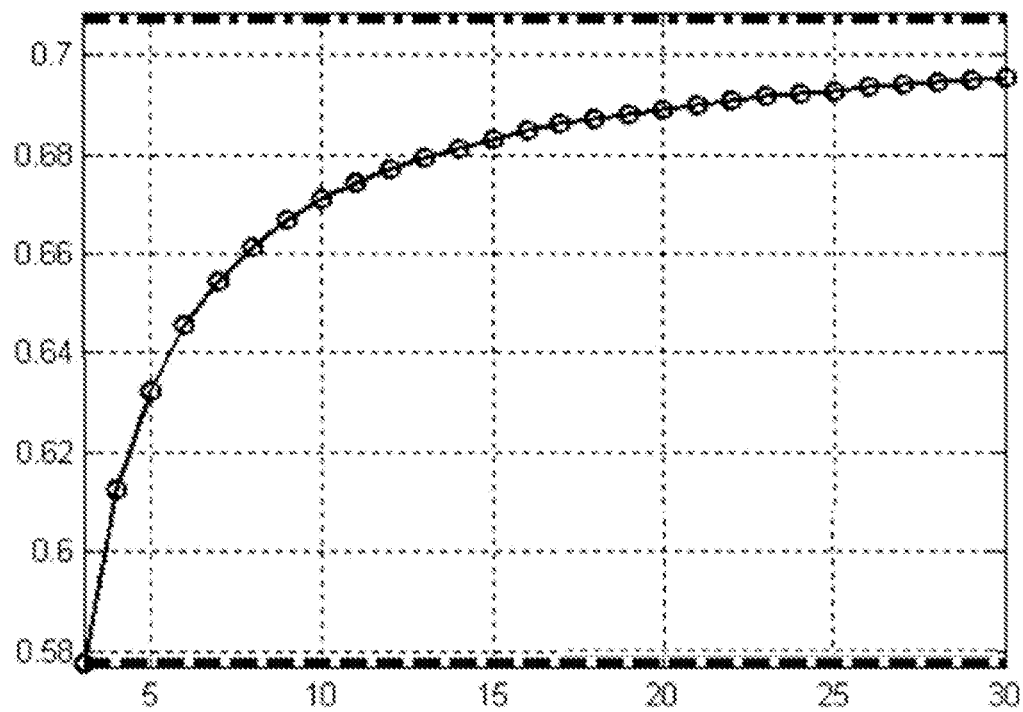
FIG. 6 shows the ratio of the noise suppression for the linear fit according to the invention and for a parabolic fit.

The method described above furthermore leads to the advantage that a better reproducibility is present compared to methods in which, for the focus-dependent registration, quadratic components also need to be taken into account in the fit with constant and linear components. FIG. 6 plots the ratio of the noise suppression for a linear and a parabolic fit as a function of the focal steps. In FIG. 6, the number of focal steps is plotted along the abscissa and the ratio of the noise suppression for a linear and a parabolic fit is plotted along the ordinate. The lower noise suppression boundary corresponds to $1/\sqrt{3}$ and the upper limit in FIG. 6 corresponds to $1/\sqrt{2}$. Therefore, there is a better noise suppression by a factor in the range from $\sqrt{3}$ to $\sqrt{2}$.

It was found that there is a reduction in the range from 58 to 70%. However, this is only relative information. In absolute terms, the increase in the suppression becomes better with increasing focal steps.

In the Kirchhoff approximation, the simulation images can be determined in accordance with the formula below for the intensity $I_z(\vec{r})$ of the imaged pattern 2 as a function of the location $\vec{r}$ in the image plane with the defocusing z in relation to the best focus position:

$$I_z(\vec{r})=\frac{1}{\lambda^4}\sum_{j=1}^{J}\mu_j\cdot\left|\int\int d^2r_1\cdot\phi_j(\vec{r}_1)\cdot U(\vec{r}-\vec{r}_1)\right|^2.$$

Using this formula, it is therefore possible to calculate the intensity as a summation over the convolution of an eigenfunction $\phi_j(\vec{r}_1)$ with the transparency function $U(\vec{r}-\vec{r}_1)$ of the pattern 2, where $\mu_j$ are the eigenvalues and $\lambda$ is the wavelength of the illumination radiation. The great advantage of this type of calculation lies in the fact that the transparency function of the pattern 2 only depends on the respective pattern itself and the eigenfunctions $\phi_j(\vec{r}_1)$ contain the properties of the imaging optical assembly 9 and of the illumination source 4. Here, non-rotationally symmetric illumination pupil distributions, any aberrations of the imaging optical assembly 9, defocusing, a pupil apodization, etc., can be taken into account, wherein the eigenfunctions for a specific illumination optical assembly 9 and a specific illumination pupil distribution of the illumination source 4 as a function of the defocus only need to be calculated once. By way of example, these eigenfunctions can be calculated in an offline step prior to carrying out the measurement. The required convolution with the transparency function U of the object 2 can then be performed online during the measurement. This can be carried out very quickly because it was found that, e.g., at most 100 different eigenfunctions (J=100) lead to simulation images with such a high accuracy that a positional error of at most 0.1 nm occurs in the simulated image.

The eigenvalue functions can be determined as follows. Here, initially, the assumption can be made that the image intensity $I_z$ corresponds to the four-fold integral with the kernel function $K_z$ specified below:

$$I_z(\vec{r}) = \frac{1}{\lambda^4} \int\int d^2r_1 \int\int d^2r_2 \cdot \underbrace{K_z(\vec{r}_1, \vec{r}_2)}_{\text{Kernel function}} \cdot U(\vec{r} - \vec{r}_1) \cdot U^*(\vec{r} - \vec{r}_2),$$

where $K_z$ can be specified as follows:

$$K_z(\vec{r}_1, \vec{r}_2) \equiv \underbrace{H(\vec{r}_2 - \vec{r}_1)}_{\text{Coherence function}} \cdot \underbrace{PSF_z(\vec{r}_1) \cdot PSF_z^*(\vec{r}_2)}_{\text{Point spread function}} = K_z^*(\vec{r}_2, \vec{r}_1)$$

$$H(\vec{r}_2 - \vec{r}_1) \equiv \int\int d^2\alpha_0 \cdot h(\vec{\alpha}_0) \cdot \exp(i \cdot k \cdot \vec{\alpha}_0 \bullet (\vec{r}_2 - \vec{r}_1))$$

$$PSF_z(\vec{r}_{1/2}) \equiv \int\int d^2\alpha \cdot \underbrace{\Pi_z(\vec{\alpha})}_{\text{Pupil function}} \cdot \exp(i \cdot k \cdot \vec{\alpha} \bullet \vec{r}_{1/2})$$

$$\Pi_z(\vec{\alpha}) \equiv \underbrace{\Pi_0(\vec{\alpha})}_{\text{Pupil function for } z=0 \, \mu m} \cdot \exp(i \cdot k \cdot \gamma \cdot z); \gamma \equiv \sqrt{1 - \|\vec{\alpha}\|^2}$$

Here, $\vec{\alpha}_0$ denotes the illumination direction, $k=2\pi/\lambda$ the wave number and $\gamma$ the z-component of the propagation unit vector $[\vec{\alpha}, \gamma]$.

The hermitian kernel function $K_z$ can be represented as follows using an algorithm, which is similar to a singular value decomposition:

$$\int\int d^2r_2 K_z(\vec{r}_1, \vec{r}_2) \cdot \phi_j(\vec{r}_2) = \mu_j \phi_j(\vec{r}_1)$$

and therefore can be rewritten as follows as a sum of dyadic products of the eigenfunctions:

$$K_z(\vec{r}_1, \vec{r}_2) \equiv \sum_{j=1}^{J} \mu_j \cdot \phi_j(\vec{r}_1) \cdot \phi_j^*(\vec{r}_2) = K_z^*(\vec{r}_2, \vec{r}_1)$$

In this approach, the eigenvalues $\mu_j$ are real values and the eigenfunctions are orthonormal.

Therefore, using this representation, the original four-fold integral can be converted into a double integral with summation by way of an approximation, which is accompanied by the described acceleration when calculating the simulation images.

If the Kirchhoff approximation is departed from, a rigorous approach is used and the polarization is therefore also taken into account, a representation for the image intensity $I_z$, in which a summation is carried out over the convolution of eigenfunctions (a dyadic product of eigenfunctions) with a transparency function T of the pattern 2, is once again arrived at in a similar manner, wherein further summations relating to the polarization directions are added because the polarization is taken into account, as specified in the following compact representation for $I_z$.

$$I_z(\vec{r}) = \frac{1}{\lambda^4} \sum_{p_0, p'=x}^{y} \sum_{R=I}^{IV} \sum_{j=1}^{J} \mu_{j,R}^{(p_0, p')} \cdot \int\int d^2r_1 \cdot$$

$$\int\int d^2r_2 \cdot T_R^{(p_0)}(\vec{r}_1, \vec{r}_2) \cdot \phi_{j,R}^{(p_0, p')}(\vec{r} - \vec{r}_1) \cdot \phi_{j,R}^{*(p_0, p')}(\vec{r} - \vec{r}_2)$$

where the following transparency function products T of the pattern 2 are to be inserted:

$$T_I^{(p_0)}(\vec{r}_1, \vec{r}_2) \equiv J^{(p_0,x)}(\vec{r}_1, \vec{0}) \cdot J^{*(p_0,x)}(\vec{r}_2, \vec{0})$$

$$T_{II}^{(p_0)}(\vec{r}_1, \vec{r}_2) \equiv J^{(p_0,y)}(\vec{r}_1, \vec{0}) \cdot J^{*(p_0,y)}(\vec{r}_2, \vec{0})$$

$$T_{III}^{(p_0)}(\vec{r}_1, \vec{r}_2) \equiv$$
$$\frac{1-i}{2} \cdot J^{(p_0,x)}(\vec{r}_1, \vec{0}) \cdot J^{*(p_0,y)}(\vec{r}_2, \vec{0}) + \frac{1+i}{2} \cdot J^{(p_0,y)}(\vec{r}_1, \vec{0}) \cdot J^{*(p_0,x)}(\vec{r}_2, \vec{0})$$

$$T_{IV}^{(p_0)}(\vec{r}_1, \vec{r}_2) \equiv \frac{1+i}{2} \cdot J^{(p_0,x)}(\vec{r}_1, \vec{0}) \cdot J^{*(p_0,y)}(\vec{r}_2, \vec{0}) +$$
$$\frac{1-i}{2} \cdot J^{(p_0,y)}(\vec{r}_1, \vec{0}) \cdot J^{*(p_0,x)}(\vec{r}_2, \vec{0})$$

Figure 7:
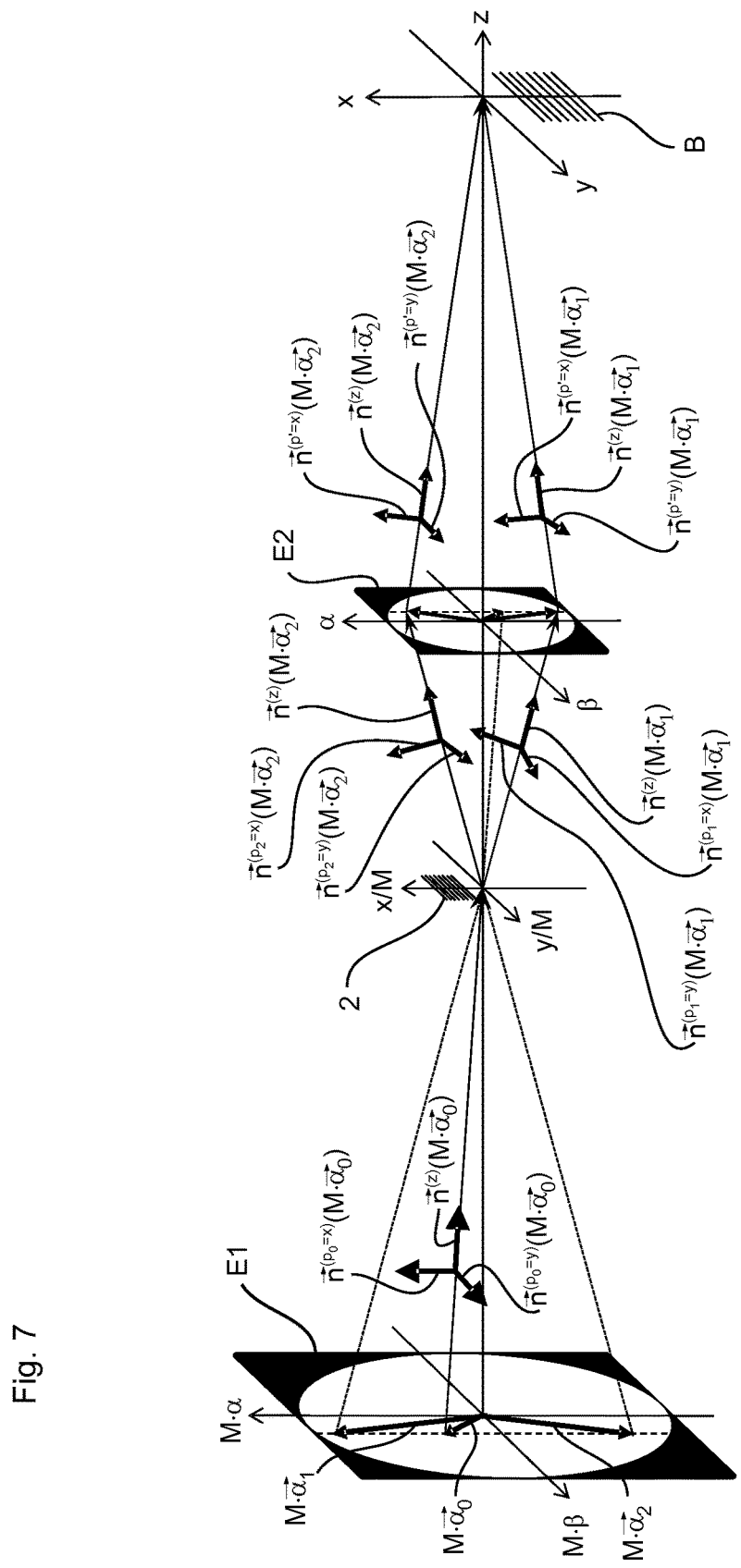
FIG. 7 shows a schematic illustration for explaining the calculation of the simulation images for the rigorous case.

The above representation applies under the constraint of greatly magnifying imaging, i.e., a magnification scale M of the image with a magnitude much greater than 1, $|M|\gg 1$. This constraint is not a fundamental restriction of the procedure, but it shortens the representation since vector projection effects in the image creation are significantly simplified. For the better understanding of the representation above, reference is made to FIG. 7, in which the illumination and imaging of the pattern 2 in an aerial image B, which can be recorded by use of the CCD camera 10, is schematically depicted. This illustration also plots the entry pupil E1 of the illumination and the exit pupil E2 of the imaging optical assembly 9. The polarization of the illumination is denoted by the superscript index $p_0$. The modified polarization of the light after interaction with the pattern 2 to be imaged is denoted by the superscript indices $p_1$ and $p_2$ and the polarization after passing through the imaging optical assembly 9, and therefore in the aerial image B, is denoted by the superscript index p'. M denotes the magnification scale of the image.

Since the polarization is taken into account, the pattern 2 is described by a Jones object, which specifies a transparency function of the pattern 2 taking into account the polarization. The formulae below serve for better understanding of the representation specified above for $I_z$ in the case where the polarization of the light is taken into account during imaging.

$$I_z(\vec{r}) + \frac{1}{\lambda^4} \sum_{p_0, p'=x}^{y} \sum_{p_1, p_2=x}^{y} \int\int d^2r_1 \int\int d^2r_2 \cdot K_z^{(p_0,p_1,p_2,p')}(\vec{r}_1, \vec{r}_2) \cdot J^{(p_0,p_1)}(\vec{r}-\vec{r}_1, \vec{0}) \cdot J^{*(p_0,p_2)}(\vec{r}-\vec{r}_2, \vec{0})$$

Jones objects:

$$J^{(p_0,p_{1/2})}(\vec{r}, \vec{0}) \equiv \int\int d^2\alpha \cdot j^{(p_0,p_{1/2})}(\vec{\alpha}, \vec{0}) \cdot \exp(i \cdot k \cdot \vec{\alpha} \bullet \vec{r});$$

$p_0, p_{1/2} = x, y$ $j^{(p_0,p_{1/2})}(\vec{\alpha}, \vec{0})$ ... Jones pupil elements for the illumination direction $\vec{\alpha}_0 = \vec{0}$ Hopkins approximation for off-axis illumination directions:

$$J^{(p_0,p_{1/2})}(\vec{r}, \vec{\alpha}_0) \equiv \int\int d^2\alpha \cdot j^{(p_0,p_{1/2})}(\vec{\alpha}, \vec{\alpha}_0) \cdot \exp(i \cdot k \cdot \vec{\alpha} \bullet \vec{r}) \cong$$

$$J^{(p_0,p_{1/2})}(\vec{r}, \vec{0}) \cdot \exp(i \cdot k \cdot \vec{\alpha}_0 \bullet \vec{r})$$

$$j^{(p_0,p_{1/2})}(\vec{\alpha}, \vec{\alpha}_0) \cong j^{(p_0,p_{1/2})}(\vec{\alpha} - \vec{\alpha}_0, \vec{0})$$

Kernel functions $$K_z^{(p_0,p_1,p_2,p')}(\vec{r}_1, \vec{r}_2) \equiv H^{(p_0)}(\vec{r}_2 - \vec{r}_1) \cdot PSF_z^{(p_1,p')}(\vec{r}_1) \cdot PSF_z^{(p_2,p')*}(\vec{r}_2)$$

Coherence functions $$H^{(p_0)}(\vec{r}_2 - \vec{r}_1) \equiv \int\int d^2\alpha_0 \cdot h^{(p_0)}(\vec{\alpha}_0) \cdot \exp(i \cdot k \cdot \vec{\alpha}_0 \bullet (\vec{r}_2 - \vec{r}_1));$$

$p_0 = x, y$

Point spread functions:

$$PSF^{(p_1,p')}(\vec{r}_1) \equiv \int\int d^2\alpha \cdot \Pi_z^{(p_1,p')}(\vec{\alpha}) \cdot \exp(i \cdot k \cdot \vec{\alpha} \bullet \vec{r}_1);$$

$p_1, p' = x, y$ $$PSF^{(p_2,p')}(\vec{r}_2) \equiv \int\int d^2\alpha \cdot \Pi_z^{(p_2,p')}(\vec{\alpha}) \cdot \exp(i \cdot k \cdot \vec{\alpha} \bullet \vec{r}_2);$$

$p_2, p' = x, y$

Kernel functions respectively as weighted sum of dyadic products of eigenfunctions $$K_R^{(p_0,p')}(\vec{r}_1, \vec{r}_2) = \sum_{j=1}^{J} \mu_{j,R}^{(p_0,p')} \cdot \phi_{j,R}^{(p_0,p')}(\vec{r}_1) \cdot \phi_{j,R}^{*(p_0,p')}(\vec{r}_2);$$

$R = I, \ldots, IV$ $$K_I^{(p_0,p')}(\vec{r}_1, \vec{r}_2) \equiv K_z^{(p_0,x,x,p')}(\vec{r}_1, \vec{r}_2);$$

$$K_{II}^{(p_0,p')}(\vec{r}_1, \vec{r}_2) \equiv K_z^{(p_0,y,y,p')}(\vec{r}_1, \vec{r}_2)$$

$$K_{III}^{(p_0,p')}(\vec{r}_1, \vec{r}_2) \equiv \frac{1+i}{2} \cdot K_z^{(p_0,x,y,p')}(\vec{r}_1, \vec{r}_2) + \frac{1-i}{2} \cdot K_z^{(p_0,y,x,p')}(\vec{r}_1, \vec{r}_2)$$

$$K_{IV}^{(p_0,p')}(\vec{r}_1, \vec{r}_2) \equiv \frac{1-i}{2} \cdot K_z^{(p_0,x,y,p')}(\vec{r}_1, \vec{r}_2) + \frac{1+i}{2} \cdot K_z^{(p_0,y,x,p')}(\vec{r}_1, \vec{r}_2)$$

Figure 8:
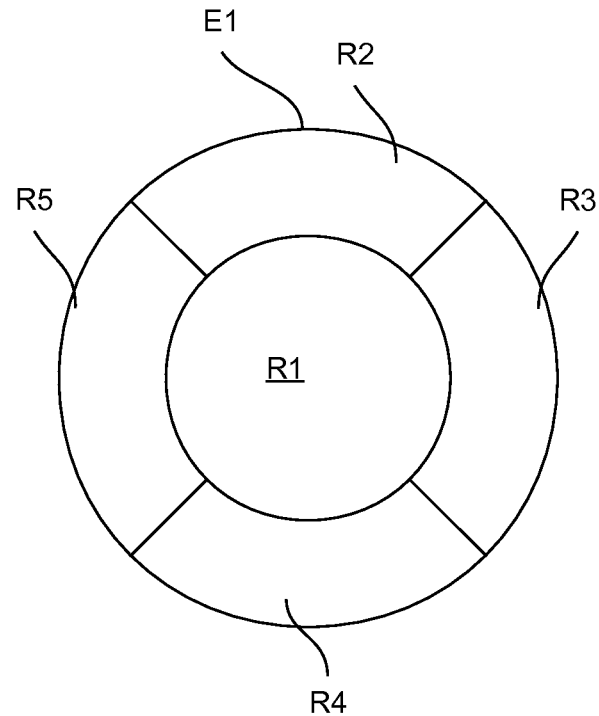
FIG. 8 shows a schematic illustration for explaining the division of the illumination pupil for calculating the simulation images.

If the previously assumed Hopkins approximation no longer applies to the whole illumination pupil E1, the illumination pupil E1 can be subdivided into portions, for which the Hopkins approximation once again applies in each case. The above procedure can be carried out for each one of these portions R1, R2, R3, R4 and R5, which are shown schematically in exemplary fashion in FIG. 8, in order in each case to achieve a compact representation for $I_z$. For all illumination directions $\vec{\alpha}_0$ within the portions, the subsequent Hopkins approximation of the Jones objects and associated Jones pupil elements must apply in each case:

Jones objects for the illumination direction $\vec{\alpha}_0$:

$$J^{(p_0,p_{1/2})}(\vec{r}, \vec{\alpha}_0) \cong J^{(p_0,p_{1/2})}(\vec{r}, \vec{\alpha}_l) \cdot \exp(i \cdot k \cdot [\vec{\alpha}_0 - \vec{\alpha}_l] \bullet \vec{r}); \quad l = 1 \ldots 5$$

$$= \underbrace{J^{(p_0,p_{1/2})}(\vec{r}, \vec{\alpha}_l) \cdot \exp(-i \cdot k \cdot \vec{\alpha}_l \bullet \vec{r})}_{\text{corresponds to } U(\vec{r}) \text{ in the Kirchhoff approximation}} \cdot \exp(i \cdot k \cdot \vec{\alpha}_0 \bullet \vec{r})$$

Jones pupil elements for the illumination direction $\vec{\alpha}_0$:

$$j^{(p_0,p_{1/2})}(\vec{\alpha}, \vec{\alpha}_0) = j^{(p_0,p_{1/2})}(\vec{\alpha}, \vec{\alpha}_l + \vec{\alpha}_0 - \vec{\alpha}_l) \cong j^{(p_0,p_{1/2})}(\vec{\alpha} - (\vec{\alpha}_0 - \vec{\alpha}_l), \vec{\alpha}_l)$$

where $\vec{\alpha}_l$, $l=1 \ldots 5$ denotes the respective representative center point of the regions R1-R5. The results of the portions (partial simulation images) need to be added in order to obtain the simulated aerial image B.

The features described above related to processing of data, e.g., according to one or more of the equation described above, can be implemented in digital electronic circuitry, or in computer hardware, firmware, software, or in combinations of them. The features can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. Alternatively or in addition, the program instructions can be encoded on a propagated signal that is an artificially generated signal, e.g., a machine-generated electrical, optical, or electromagnetic signal that is generated to encode information for transmission to suitable receiver apparatus for execution by a programmable processor.

The described features related to processing of data can be implemented advantageously in one or more computer programs that are executable on a programmable system including at least one programmable processor coupled to receive data and instructions from, and to transmit data and instructions to, a data storage system, an input device, and an output device. A computer program is a set of instructions that can be used, directly or indirectly, in a computer to perform a certain activity or bring about a certain result. A computer program can be written in any form of programming language (e.g., Fortran, C, C++, Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. For example, the control unit 13 can evaluate the recorded measurement images and may include one or more such processors that execute instructions for implementing at least a portion of the process for determining a lateral offset of a pattern on a substrate relative to a desired position. Generally, a processor will receive instructions and data from a read-only memory or a random access memory or both. The elements of a computer include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

The system for determining a lateral offset of a pattern on a substrate relative to a desired position can include a simulation unit that produces the simulation images described above. The simulation unit can include one or more processors that execute instructions for producing the simulation images.

To provide for interaction with a user, the features can be implemented on a computer having a display device such as a LCD (liquid crystal display) monitor, an electronic ink (E-ink) display, or an organic light emitting diode (OLED) display for displaying information to the user and a keyboard and a pointing device such as a mouse, a trackball, or touchpad by which the user can provide input to the computer. A touch display can also be used in which the display surface is sensitive to touch inputs from a user.

A number of implementations have been described. Nevertheless, it will be understood that various modifications may be made. For example, elements of one or more implementations may be combined, deleted, modified, or supplemented to form further implementations. As yet another example, the logic flows of processes described above do not require the particular order shown, or sequential order, to achieve desirable results. In addition, other steps may be provided, or steps may be eliminated, from the described flows, and other components may be added to, or removed from, the described systems. For example, the measurement patterns can be different from those described above. Accordingly, other implementations are within the scope of the following claims.

What is claimed is:

1. A method for determining a lateral offset of a pattern on a substrate relative to a desired position, comprising the following steps:
    a) providing a plurality of measurement images of the pattern, which were produced by an optical recording unit in different recording defocus positions along a focusing direction of the recording unit, wherein the recording defocus positions are equidistant with a predetermined increment;
    b) producing a plurality of simulation images, which simulate the recording of the pattern with the optical recording unit in different simulation defocus positions in the focusing direction, wherein at least one optical aberration of the recording unit is taken into account when producing the simulation images and the simulation defocus positions are equidistant with the predetermined increment;
    c) forming a plurality of first pairs, which each has a measurement image and a simulation image, wherein each first pair has the same first focal distance of the defocus positions thereof, and determining a first lateral distance of the patterns for each first pair;
    d) determining a first linear fit line on the basis of the determined first lateral distances;
    e) forming a plurality of second pairs, which each has a measurement image and a simulation image, wherein each second pair has the same second focal distance of the defocus positions thereof, which is different from the first focal distance of the first pairs, and determining a second lateral distance of the patterns for each second pair;
    f) determining a second linear fit line on the basis of the determined second lateral distances; and
    g) determining the lateral offset of the pattern on the substrate relative to the desired position using the linear fit lines in accordance with steps d) and f).

2. The method as claimed in claim 1, wherein a cross correlation of the measurement image and simulation image of the respective first pair is carried out in step c) to determine the first lateral distance.

3. The method as claimed in claim 2, wherein a cross correlation of the measurement image and simulation image of the respective second pair is carried out in step e) to determine the second lateral distance.

4. The method as claimed in claim 1, wherein a cross correlation of the measurement image and simulation image of the respective second pair is carried out in step e) to determine the second lateral distance.

5. The method as claimed in claim 1, wherein, in step c), the lateral position of the pattern in the measurement image and simulation image of the respective first pair is determined and the first lateral distance is determined from the lateral positions.

6. The method as claimed in claim 5, wherein the lateral position of the pattern in the measurement image and simulation image is determined by use of a thresholding method.

7. The method as claimed in claim 1, wherein, in step e), the lateral position of the pattern in the measurement image and simulation image of the respective second pair is determined and the second lateral distance is determined from the lateral positions.

8. The method as claimed in claim 7, wherein the lateral position of the pattern in the measurement image and simulation image is determined by use of a thresholding method.

9. The method as claimed in claim 1, wherein the first focal distance and the second focal distance are selected in such a way that the difference in the magnitudes of the first focal distance and second focal distance equals the predetermined increment or an integer multiple of the predetermined increment.

10. The method as claimed in claim 1, wherein the first focal distance and second focal distance have different signs.

11. The method as claimed in claim 1, wherein, in step g), a linear correction line is established from the two linear fit lines of step d) and f) and the lateral offset of the pattern on the substrate relative to the desired position is established on the basis of the linear correction line.

12. The method as claimed in claim 1, wherein, in step b), those optical aberrations which lead to a curved profile of the lateral position of the pattern as a function of the simulation defocus position are taken into account.

13. The method as claimed in claim 1, wherein, in step b), a summation of a convolution of an optical function, which is represented as a sum of dyadic products of eigenfunctions, weighted with associated eigenvalues, and which describes the simulation defocus position, the at least one optical aberration and the illumination pupil distribution of the optical recording unit, with a transparency function, which only describes the pattern, is performed over various eigenfunction indices for each simulation image in order to produce the simulation images.

14. The method as claimed in claim 13, wherein, in step a), the measurement images are recorded and, in step b), the optical function is determined before carrying out the recording of the measurement images.

15. The method as claimed in claim 14, wherein, in step b), a summation of a convolution of an optical function, which is represented as a sum of dyadic products of eigenfunctions, weighted with associated eigenvalues, and which describes the simulation defocus position, the at least one optical aberration and the illumination pupil distribution of the optical recording unit, with a transparency function, which only describes the pattern, is performed over various eigenfunction indices for each simulation image in order to produce the simulation images.

16. The method as claimed in claim 13, wherein, in step b), the illumination pupil of the optical recording unit is subdivided by computation into at least two parts and a separate optical function is created for each part, which optical function is represented as a sum of dyadic products of eigenfunctions, weighted with associated eigenvalues, and which describes the simulation defocus position, the at least one optical aberration and the illumination pupil distribution of the respective part, and the summation of the convolution of the corresponding optical function with the transparency function is performed over various eigenfunction indices for each part in order to obtain a partial simulation image and the partial simulation images are then summed in order to obtain the simulation image.

17. A device for determining a lateral offset of a pattern on a substrate relative to a desired position, comprising
an optical recording unit comprising an imaging optical assembly, which produces a plurality of measurement images of the pattern in different recording defocus positions along a focusing direction, wherein the recording defocus positions are equidistant with a predetermined increment;
a simulation unit comprising a processor, which produces a plurality of simulation images, which simulate the recording of the pattern with the optical recording unit in different simulation defocus positions in the focusing direction, wherein at least one optical aberration of the recording unit is taken into account when producing the simulation images and the simulation defocus positions are equidistant with the predetermined increment; and
an evaluation unit comprising a processor, which carries out the following steps:
forming a plurality of first pairs, which each has a measurement image and a simulation image, wherein each first pair has the same first focal distance of the defocus positions thereof, and determining a first lateral distance of the patterns for each first pair;
determining a first linear fit line on the basis of the determined first lateral distances,
forming a plurality of second pairs, which each has a measurement image and a simulation image, wherein each second pair has the same second focal distance of the defocus positions thereof, which is different from the first focal distance of the first pairs, and determining a second lateral distance of the patterns for each second pair;
determining a second linear fit line on the basis of the determined second lateral distances; and
determining the lateral offset of the pattern on the substrate relative to the desired position using the determined linear fit lines.

18. The device of claim 17 in which the evaluation unit is configured to carry out a cross correlation of the measurement image and the simulation image of the respective first pair to determine the first lateral distance.

19. The device of claim 17 in which the evaluation unit is configured to carry out a cross correlation of the measurement image and the simulation image of the respective second pair to determine the second lateral distance.

20. The device of claim 17 in which the evaluation unit is configured to determine the lateral position of the pattern in the measurement image and the simulation image of the respective first pair, and determine the first lateral distance from the lateral positions.

* * * * *

UNITED STATES PATENT AND TRADEMARK OFFICE
CERTIFICATE OF CORRECTION

PATENT NO. : 9,786,046 B2
APPLICATION NO. : 14/881513
DATED : October 10, 2017
INVENTOR(S) : Michael Arnz and Dirk Seidel It is certified that error appears in the above-identified patent and that said Letters Patent is hereby corrected as shown below:

Column 10

Line 6 (Approx.), after "$A_{\Delta z} \equiv C \cdot (\zeta_1 + \Delta z - \zeta_2)$" insert -- . --

Lines 37-38 (Approx.), delete "$(\Delta z_2 \cdot R_1(0) - \Delta z_1 \sim R_2(0) - \tfrac{1}{2}\Delta z_2 \cdot \Delta z_1 \cdot [A_2 - A_1]/(\Delta z_2 - \Delta z_1)$,"

and insert -- $\left(\Delta z_2 \cdot R_1(0) - \Delta z_1 \cdot R_2(0) - \frac{1}{2}\Delta z_2 \cdot \Delta z_1 \cdot [A_2 - A_1]\right)/(\Delta z_2 - \Delta z_1)$ --

Column 13

Line 6 (Approx.), delete "$I_z(\vec{r}) +$" and insert -- $I_z(\vec{r}) =$ --

Line 20, delete "directions:" and insert -- directions : --

Line 26 (Approx.), delete "functions:" and insert -- functions : --

Line 29 (Approx.), delete "functions:" and insert -- functions : --

Line 43 (Approx.), delete "eigenfunctions" and insert -- eigenfunctions : --

Column 14

Line 9 (Approx.), delete "$U(\vec{r}) in$" and insert -- $U(\vec{r})\ in$ --

Signed and Sealed this
Fifth Day of December, 2017

Joseph Matal
*Performing the Functions and Duties of the*
*Under Secretary of Commerce for Intellectual Property and*
*Director of the United States Patent and Trademark Office*